Oct. 19, 1954
E. DOMBROWSKI
2,691,823
GRASS CUTTING DEVICE
Filed May 11, 1950
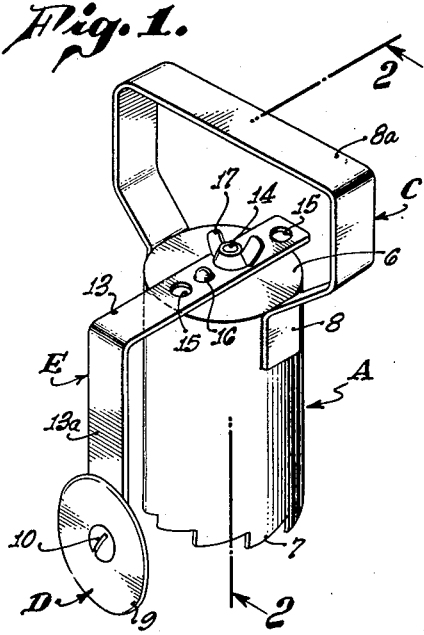
INVENTOR.
EDWARD DOMBROWSKI,
BY
Paul A. Weilein
ATTORNEY.

Patented Oct. 19, 1954

2,691,823

UNITED STATES PATENT OFFICE 2,691,823

GRASS CUTTING DEVICE

Edward Dombrowski, South Pasadena, Calif.

Application May 11, 1950, Serial No. 161,386

2 Claims. (Cl. 30—300)

This invention relates to a cutting or trimming device for clearing the ground around a sprinkler head, of grass and sod to prevent obstruction of the head and consequent operational failure thereof.

One of the objects of this invention is to provide an improved device of this character.

Another object is to provide a device such as described which may be easily manipulated to cut and loosen for removal an annular portion of sod around a sprinkler head as well as to cut the grass around the head and to form around the head a hole which is free from grass, roots and dirt and will inhibit regrowth and consequent obstruction of the sprinkler.

A further object is to provide a cutting device such as described which is readily adjustable to make holes of varying diameters best to clear the ground and remove obstructing growth around particular sprinkler head installations.

Another object is to provide a device of the character described which may be operated to make annular holes of different depths as desired over a wide depth range around a sprinkler head, according to the particular head and nature of the ground or vegetation adjacent the head.

Yet another object is to provide a device such as described wherein the body member thereof serves as a sprinkler head-encompassing guide providing for rotation of the device about the axis of the head, as a cutter for making a rotative and/or penetrative cut in the ground close to and around the head, and as a carrier and support for a second cutter which cooperates with the cutter portion of the body member to cut out an annulus of sod or ground in a particularly efficacious manner.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a perspective view of a device embodying the present invention;

Figure 2 is a vertical sectional view taken on the plane of line 2—2 of Figure 1, showing an application of the device for clearing the ground surrounding a sprinkler head;

Figure 3 is a fragmentary top plan view of the device;

Figure 4 is a perspective view of a modified form of this invention; and

Figure 5 is a perspective view of a modified form of cutting blade which is applicable alike to the two forms of the device here shown.

Referring to Figures 1, 2 and 3, the form of my invention there shown generally comprises a body member A adapted to encompass a sprinkler head B, a handle C by means of which the body member may be rotated about the axis of the sprinkler head, and a cutter or blade D supported in outwardly spaced relation to the body member by means of an arm E so as to be rotated with the body member.

In accordance with this invention the body member A, serves as a cutting member, as a supporting and operating means for the cutter blade D, and as a sprinkler head encompassing guide whereby the body member and cutter D may be rotated about the axis of the sprinkler head.

In its present form the body member A is cylindrical with its upper end closed by an integral wall 6 and its lower end open and provided with integral cutting teeth 7 sharpened on angular related edges thereof whereby the lower edge of the body member will serve as a cutter and may be pushed into the ground around the sprinkler head while being rotated or while stationary, as desired. The open end of the body member is of such diameter as to permit it to be placed in encompassing relation over sprinkler heads of the standard larger size, and will have sufficient clearance for free rotation of the body member while yet closely spaced from the head. This enables the cutting of grass or the ground, close to the head by means of the teeth 7 either on penetration of the ground or upon rotation of the teeth against the grass or upon a combined rotative and penetrative movement of the teeth. The encompassing of the sprinkler head by the body member A, assures that that body member will be guided and freely rotated about the axis of the head.

The handle C as here shown is made of an inverted U-shaped metal strap having inwardly bent end portions 8 which are fixed to opposite sides of the body member near the top of the latter, as by being welded thereto. This formation of the handle provides an ample gripping portion 8a over the center of the top of the body portion, whereby the handle may be effectively held for turning the body portion and for pushing it downwardly to penetrate the ground. Moreover, the handle is so dimensioned and spaced above and outwardly from the sides of the body member as to permit the operator or user to place his foot on top of the body member beneath the gripping portion 8a for forcing the body portion into the ground, the height of the body portion and the manner of mounting the cutter blade D affording penetration into the ground to depths best to clean out around the particular sprinkler head and ground in which the head is installed.

As shown in Figures 1, 2 and 3, the cutter blade D is in the form of a circular disk 9 having a sharpened periphery and mounted to rotate on a horizontal axis provided by the screw 10, held on the lower end of the arm E by means of a nut 11, there being appropriately placed washers 12 for spacing the cutter from the arm and to facilitate free rotation of the cutter.

The arm E is L-shaped and has its horizontal leg 13 adjustably secured on the wall 6 at the top of the body member whereby the vertical leg 13a and cutter D thereon may be variously laterally spaced from the body member so that the diameter of the cut made by cutter D may be varied to suit the conditions at hand and best to clean out around particular sprinkler heads and in ground where different vegetation may indicate that a cleared space of a particular size is required.

As means for adjustably securing the arm E to the body member A, the top wall 6 is provided with an upstanding screw threaded pin 14, fixed thereto so as to be inserted through any one of a series of spaced openings 15 ranging longitudinally of the horizontal leg of the arm. A similar non-threaded pin 16 fixed on the top wall to one side of and in line with the screw threaded pin is spaced so as to extend through one of the openings 15 to prevent rotative movement of the arm on the pin 14. A wing nut 17 is turned on the pin 14 and bears against the leg 13 of the arm E to detachably hold the latter in place.

In the present embodiment, the lower extremity of the cutter D is substantially co-planar with the extremities of the teeth 7 forming the cutting edge on the lower end of the body member A, so that a uniform double cut and an annular hole of uniform depth will be provided, and the device will stand substantially vertically when in use. However, these dimensions may be varied if desired without objectionably affecting the operation of the device.

It will now be apparent that in order to clear the ground area around a sprinkler head to remove grass or other growth which obstructs the head and interferes with proper emission of jets therefrom, the user of the device places the open end of the body portion A over the sprinkler head so that the cutting edge defined by the teeth 7 contacts ground or the grass surrounding the head, and the disk cutter D likewise contacts the ground at a point spaced outwardly from the body portion an extent depending upon the adjustment of the arm E. This adjustment is effected readily as hereinbefore noted to set the cutter D as desired, best to suit the particular sprinkler head and nature of the obstructing vegetation around the head.

With the device in place as above described, the operator holding the handle B, turns the body portion about the axis of the sprinkler head while pressing downwardly and thereby causes the grass around the head to be cut and the turf or sod to be cut in annular form by the action of the rotary cutter D and the teeth 7. The annular piece of sod or turf thus cut can readily be removed, thereby providing a clean annular well around the sprinkler head, free from grass or any other matter which otherwise would obstruct the head and cause operational failure thereof.

As shown in Figure 4, a modified form of this invention is of the same construction except for the outer cutter F and the extra handle G. Consequently, in Figure 4, the body member, angular arm supporting the cutter F, and handle and teeth on the body member are identified by the same reference characters as applied to corresponding parts in Figures 1, 2 and 3.

In this modified form of the invention the cutter F is fixed to the arm E as by being welded thereto (see Figure 5), and is in the form of a blade 18 which is elongated vertically and curved in the direction of its travel so as to be substantially concentric with the axis of the body portion A. This blade is reduced toward its lower end and has a downwardly and inwardly curving cutting edge 19 which faces in the direction in which the device is rotated when the device is operated in the same manner as the device shown in Figures 1, 2 and 3.

It should be noted that the fixed blade type of cutter F may be used instead of the rotary disk cutter D, with the form of the device shown in Figures 1, 2 and 3, and that the disk type D may also be used on the modified device shown in Figure 4.

The extra handle G has a bifurcated lower end 20 which is fastened as at 21 to the handle B to form therewith a stirrup accommodation for the foot of the user to permit of pushing the cutting device into the ground. The handle G, with the two hand gripping portions 22 is dimensioned so that the user may stand upright in operating the device. It is obvious that the handle G may, if desired, readily be applied to the form of the invention shown in Figures 1, 2 and 3.

While the body portion in the present embodiment of this invention is of cylindrical form, it is to be understood that it may be otherwise formed provided it will embrace the sprinkler head for free rotation therearound about the axis of the head and will support and move in a circuitous path, the outer cutter D or F or a cutter similar thereto as the case may be.

I claim:

1. In a device for cutting grass and sod around a sprinkler head, a body member having a sprinkler head embracing portion arranged to penetrate the ground and to be rotated with said member about the head, a cutter for cutting around said head, and means connecting said cutter for rotation with said body member around said head in a path which is spaced outwardly from said body member, said connecting means including an L-shaped arm connected at one end with said cutter, said arm having a series of openings therein adjacent the other end thereof, an element on said body member selectively insertable through said openings for setting said cutter in different offset positions relative to the ground penetrating portion of said body member, and a projection on said body member to one side of said element engageable in an opening in said arm to restrain rotative movement of said arm about said element.

2. A device for cutting sod around a sprinkler head comprising: a tubular body having a continuous annular cutting edge at one end thereof; a handle fixed to and extending upwardly from the other end of said body; a pair of projections on said other end of said body; an L-shaped arm having a series of longitudinally spaced openings therein; pairs of said openings adapted to receive said projections; means cooperable with one of said projections for clamping said arm on said body; said arm having a portion extending alongside said body in laterally spaced relation thereto; and a rotary disc cutter mounted on said portion of said arm; the lower edge of said cutter being disposed adjacent said one end of said body in laterally spaced relation thereto.

References Cited in the file of this patent

UNITED STATES PATENTS

| Number | Name | Date |
| --- | --- | --- |
| 1,301,875 | Prosser | Apr. 29, 1919 |
| 1,866,073 | Aberle | July 5, 1932 |
| 2,245,959 | Brown | June 17, 1941 |
| 2,468,504 | Little | Apr. 26, 1949 |
| 2,516,448 | Canton | July 25, 1950 |